No. 868,502. PATENTED OCT. 15, 1907.
C. P. STEINMETZ.
ARC LAMP ELECTRODE.
APPLICATION FILED DEC. 7, 1904. RENEWED JULY 20, 1907.
WITNESSES:
George A. Thornton
Arlen Oxford
INVENTOR:
Charles P. Steinmetz,
By Albert G. Davis,
Att'y.

UNITED STATES PATENT OFFICE.

CHARLES P. STEINMETZ, OF SCHENECTADY, NEW YORK, ASSIGNOR TO GENERAL ELECTRIC COMPANY, A CORPORATION OF NEW YORK.

ARC-LAMP ELECTRODE.

No. 868,502.      Specification of Letters Patent.      Patented Oct. 15, 1907.

Application filed December 7, 1904, Serial No. 235,788. Renewed July 20, 1907. Serial No. 384,764.

*To all whom it may concern:*

Be it known that I, CHARLES P. STEINMETZ, a citizen of the United States, residing at Schenectady, county of Schenectady, State of New York, have invented certain new and useful Improvements in Arc-Lamp Electrodes, of which the following is a specification.

During the operation of arc lamps having certain kinds of electrodes a liquid or fluid pool formed of molten material exists at the end of the lower and generally the negative electrode. This liquid pool is formed on electrodes made of materials the boiling point of which is considerably above the melting point. As an example of such electrodes I may mention those made of magnetite or titanium carbid, or mixtures of magnetite and titanium compounds. The arc in its passage from an electrode of the general character specified is carried by means of a bridge of vapor issuing from a point on the negative electrode and has apparently the characteristics of a high velocity blast. The reaction of this high velocity blast upon the point where it leaves the negative electrode causes a noticeable depression in the liquid pool. The arc, however, tends always to pass across the shortest distance between the electrodes and therefore tends to climb up the sides of the depression. In doing so a new spot in the liquid pool is depressed. A continuance of this action results in a more or less rapid motion of the negative spot over the liquid pool and thus causes a trembling or rapid flicker of the arc flame.

I have found that if, instead of using a homogeneous mixture for the electrode from which the arc blast issues, I use a mixture consisting of a practically homogeneous body interspersed with a refractory material in granulated form, say in grains of 1/32 to 1/16 of an inch diameter, then when the liquid pool is formed these grains of refractory material project above the surface of the pool and serve to center the point of emission of the arc flame or blast. The action continues until the granule is gradually worn below the surface of the pool whereupon the arc jumps to the next grain and so on. Except for relatively infrequent transitions of the arc from one granule to another the arc flame remains absolutely steady.

In the drawings I have represented an electrode embodying my invention. This electrode may consist of a thin metal tube such as 1 filled with a suitable compound of some finely powdered material as 2, having interpersed therewith granules such as 3 of some more refractorm material. The filling for the metal tube can be made by packing the same into the tube in the form of powder, or by first molding the material into sticks and then inserting the sticks into the tube. The electrode may of course consist merely of the molded stick. The body of the electrode, such as 2, may consist of powdered magnetite and titanium, while the granules 3 may, for example, consist of chromite. Instead of the granules of chromite I may use granules of titanium oxid. Whatever the chemical constituents of the electrode material may be it will be understood that the general principle of my invention is to have some constituent of the electrode in more or less granular form and of a nature which is more refractory than the body of the electrode with which it is interspersed.

What I claim as new, and desire to secure by Letters Patent of the United States, is,—

1. An arc light electrode consisting of a mixture of a powder with granules of a more refractory material than the powder.

2. An arc light electrode, the body of which is formed of material which melts locally where the arc springs therefrom, and granules of relatively more refractory material mixed with said body of material, whereby, when the electrode is in operation, they project above the liquid pool formed by the melted portion of the body of the electrode.

3. An arc light electrode formed of a number of interspersed constituents, one of which is more refractory than the rest and remains unfused in the melted pool formed on the electrode during operation whereby it steadies the arc.

In witness whereof I have hereunto set my hand this 6th day of December, 1904.

CHARLES P. STEINMETZ.

Witnesses:
   BENJAMIN B. HULL,
   HELEN ORFORD.